US 6,726,636 B2

United States Patent
Der Ghazarian et al.

(10) Patent No.: US 6,726,636 B2
(45) Date of Patent: Apr. 27, 2004

(54) BREATHALYZER WITH VOICE RECOGNITION

(75) Inventors: Viken Der Ghazarian, West Hills, CA (US); Ohanes Der Ghazarian, Henderson, NV (US)

(73) Assignee: Loran Technologies, Inc., Carson City, NV (US)

( * ) Notice: Subject to any disclaimer, the term of this patent is extended or adjusted under 35 U.S.C. 154(b) by 0 days.

(21) Appl. No.: 09/866,791

(22) Filed: Mar. 28, 2001

(65) Prior Publication Data

US 2002/0084130 A1 Jul. 4, 2002

Related U.S. Application Data

(60) Provisional application No. 60/196,429, filed on Apr. 12, 2000.

(51) Int. Cl.[7] .................................................. A61B 5/00
(52) U.S. Cl. ........................ 600/532; 73/23.3; 422/84
(58) Field of Search ........................ 600/532; 73/23.3; 422/84

(56) References Cited

U.S. PATENT DOCUMENTS

| | | | | |
|---|---|---|---|---|
| 4,868,545 A | * | 9/1989 | Jones ........................ 73/23.3 |
| 4,996,161 A | * | 2/1991 | Connors et al. ............ 600/532 |
| 4,999,613 A | * | 3/1991 | Williamson et al. ........ 600/532 |
| 5,220,919 A | * | 6/1993 | Phillips et al. .............. 600/532 |
| 5,586,171 A | * | 12/1996 | McAllister et al. ........... 379/67 |
| 5,913,310 A | * | 6/1999 | Brown ........................ 600/300 |
| 6,167,746 B1 | * | 1/2001 | Gammenthaler ............ 73/23.3 |
| 6,229,908 B1 | * | 5/2001 | Edmonds, III et al. ..... 340/573 |

* cited by examiner

*Primary Examiner*—Robert L. Nasser
(74) *Attorney, Agent, or Firm*—Stetina Brunda Garred & Brucker

(57) ABSTRACT

A Voice recognition Breathalyzer comprises of a microphone for transducing spoken expression into electronic signals and a breathalyzer sensor for transducing given breath content into electronic signals.

An audio and breathalyzer sensor circuit for conditioning said electronic signals from said microphone and breathalyzer sensor;
  a memory storage for storing speech templates and toxic breath setting;
  a processor for processing said conditioned electronic signals and for simultaneously comparing the processed, conditioned electronic signals with said speech templates and said toxic breath setting threshold stored in said memory storage, said processor generating a unique signal when said processed, conditioned electronic signals are substantially similar to one of said speech templates and below said toxic breath setting threshold. In the preferred embodiment of invention said voice recognition breathalyzer is mobil and it's powered by a battery and said unique signals are transmitted by an RF link.

5 Claims, 3 Drawing Sheets

BLOCK DIAGRAM
BREATHALYZER IMMOBILIZER WITH VOICE RECOGNITION

BREATHALYZER WITH VOICE RECOGNITION

This application claims benefit of provisional application Ser. No. 60/196,429 filed Apr. 12, 2000.

BACKGROUND OF THE INVENTION

The present invention relates to the field of breath alcohol detection to prevent drunk driving, and more particularly to an improved breath alcohol detection system by combining user voice recognition with user breath sampling taken during user given password speech, to insure the unsupervised test measurement based on user voice signature.

Various attempts have been made to develop devises which prevent automobiles and the like from being operated by drunk individuals. A typical breath testing sobriety interlock, of this type is illustrated in U.S. Pat. No. 4,738,333 to collier, teaches a breathalyzer interlock system used for monitoring the performance of an identity confirming the physical act by the operator, said identity confirming act requiring a sufficient degree of skill as to be incapable of performance in fewer than predetermined number of attempts by substantially all persons other then designated operators who possess said degree of skill. Collier physical act identity confirming requires skilled person using at least one of lips, mouth, tongue and vocal chords to generate at least one tone in a specific frequency range. This has proven to be less than completely desirable because it can not surely Identify the operator, since it requires operator of special skill to move a lip or set the mouth at a certain position into a tube to make a certain frequency sound with a vocal cord. The user in some occasion may not be able to produce said frequency, or some one else with little training easily can reproduce said certain vocal frequency.

Another Method and apparatus for sonic breath determination is illustrated in U.S. Pat. No. 5,734,090 to Koppel which teaches a method and a apparatus for verifying an expiratory breath flow utilizing the sonic characteristic of a standardized breath as reference, where a breath sample is analyzed for the presence and absence of predetermined audio frequency components generated by the expiratory process. Breath sample validity is based upon a match between both the required and missing components. This technique is used to determine a certain frequency produced by the human breath exhale to ascertain the air given into the breathalyzer is that of human or bogus air. Which in this case the prior art fails to identify the user.

In addition other methods has been illustrated in U.S. Pat. No. 4,843,377 to Fuller where in a remote location the prisoner under home arrest is being identified by pictorial image taken by a videophone and user voice tone given into a breathalyzer tube, said information is being sent to a monitoring station through standard phone line. Another problem encountered with the system of the '377 patent is that, it can operate by a skilled person trained to blow into a tube and produce a certain frequency vocal sound into said tube without removal of mouth from the tube. Fuller technique is not easy and practical for use, the production of certain human vocal sound easily can be reproduced by another person. For User Identification The use of video image is a good concept but requires constant human surveillance. U.S. Pat. No. 4,999,613 to Williams which teaches a remote confinement system, unsupervised test to determine the presence, identity or conduct of prisoner, is performed by a transmitter attached to the prisoner and a receiver at the remote location, a voice test performed to identify a specific prisoner and breath alcohol test to determine the prisoner's soberly. Events which include test results are sent to a monitoring station through standard phone line. Williams et al. System is highly useful and represents a significant improvement in the art, it does not address the problem addressed by the present invention, namely because the monitoring station can not monitor the presence and perform sobriety test to a person to be monitored when said person is in mobile condition or said person is in a automobile. In reference to Williams et al. the prisoner in order to be in compliance must perform test at a predetermined time at a location, the prisoner must inhale and exhale into a tube regardless of being sober or intoxicated. The present invention if user given password does not contain alcohol, it will not be necessary for user to give full lung inhale exhale breath into the voice recognition breathalyzer.

Even though prior art are useful and good inventions, prior arts fail to provide unsupervised test using voice recognition process to determine the identity and breath alcohol content of a vehicle operator during giving spoken password. In addition in prior arts, the monitoring station fails to supervise and give instruction to a mobil vehicle operator to perform soberly test with user voice recognition and fails to identify the driver and locate the vehicle location by use of GPS/GSM.

It is according to the primary objective of the present invention that it provides a voice recognition breathalyzer system which uses the voice of the vehicle's operator to thereby provide a operator identification and detection of alcohol during the operators given spoken password, if alcohol is present in operators breath during given speech into said breathalyzer, said vehicle ignition will remain inmmobilized. The present invention provides a vehicle ignition interlock CPU which is passive arming.

It is according to present invention additionally the vehicle operator carries a tamper proof wrist mounted RF transceiver with a built-in vibrator to communicate with the vehicle mounted breathalyzer CPU which is able to identify the operator and it's presence within a particular vehicle and accordingly signal to the operator of a particular vehicle by vibrating or producing audiovisual signal, reminding the operator to produce given voice recognition breath test prior starting the vehicle engine and to signal the particular vehicle operator to perform given verbal breath rolling test during driving.

In a preferred embodiment said voice recognition breathalyzer is in a hand held housing which has a built-in transmitter to communicate with vehicle installed ignition interlock devise to disarm said vehicle ignition interlock and or to start said vehicle engine.

In another embodiment of the invention, said voice recognition breathalyzer is within a mobile phone to communicate with a particular user given breath test data to a monitoring station, or with a vehicle mounted GSM phone unit to disarm said vehicle engine interlock device with DTMF, or voice command, or send RF command signals to said vehicle ignition interlock CPU.

Additionally, if said voice recognition breathalyzer detects alcohol presence during user given password speech, the breathalyzer CPU produce's audio-visual signals to the operator to give full long inhale exhale breath into said voice recognition breathalyzer, to measure precise breath alcohol content of the operator. If given password breath into said voice recognition breathalyzer does not contain alcohol, it is not necessary for user to give full long inhale exhale breath test, thus eliminating unnecessary deep lunge breath inhale exhale into the breathalyzer unit in order to operate the vehicle.

Finally In the present invention during a rolling test, if vehicle operator fails voice recognition sobriety test, the monitoring station is capable of locating said vehicle and immobilizing said vehicle engine at a safe speed by use off GPS/GSM module. The breathalyzer, the ignition interlock, and GPS/GSM module with antenna, used in the present invention, are of tamper-proof design, unauthorized removal any of the units or tampering with power supply, or harness will immobilize the vehicles engine by interrupting the flow of needed data sent from said units to said vehicle electronic fuel pump, ignition or starter controller CPU unit. In addition in the present invention said vehicle installed GSM unit is capable sending said tamper signal to the monitoring station.

The components used in the present invention, are easily obtainable, for example the Voice recognition processor is commonly used in many different voice operated applications. Breathalyzer sensor are successfully used with many law enforcement agencies applications, and GPS/GSM phones are commonly used today with many communication and monitoring companies and are easily obtainable off the shelf and reasonable priced.

SUMMARY OF THE INVENTION

The present invention provides a sobriety test and method which, without requiring human supervision, confirms the identity of a vehicle operator by user voice recognition during given password command, and breath content into a voice recognition breathalyzer. If the password is valid and breath sample is non toxic, the vehicle breathalyzer CPU disables the vehicle ignition interlock and the operator can start the vehicle successfully. If the given speech breath content contains alcohol the operator can not start the vehicle, the voice recognition breathalyzer signals the operator to give a deep long sample of breath to assure a precise reading. If reading result is above a set threshold the operator can not start the vehicle. If the reading result is at a lower then set threshold the operator can start the vehicle The technique avoids the unnecessary deep lunge breath inhale exhale test for every time operator desires to start the vehicle. In addition the invention provides secure operation by identifying the operators voice signature.

In the present invention multiple user voices could be programed into the system. The system could be pre programed into such as it will be not necessary for all user given password to be analyzed for breath alcohol content. The system will be responsive to analyze breath content of specific operators upon their voice recognition by the system. In a preferred embodiment of the present invention, the voice recognition breathalyzer is portable and it's built in to a remote RF transmitter with a voice recognition circuitry and breath alcohol sensing circuitry, to identify the user and analyze user breath content for alcohol and transmit user test (passed or fail) data signal by user voice recognition and breath sampling. The pass signal is used for disarming a vehicle installed ignition interlock or a car alarm system, or used for starting a vehicle engine. Said vehicle engine immobilizer CPU being passive arming, it will automatically engage the engine interlock circuitry when said vehicle ignition is being turned off. In the present invention, the vehicle Immobilizer CPU passive arming feature could be temporarily bypassed by operators speech command whose voice is not programmed to be tested for breath alcohol.

It is according to the present invention additionally, the vehicle operator carries a tamper proof wrist mounted RF transceiver has a built in vibrator, to communicate with the vehicle mounted breathalyzer CPU to identify the operator, and it's presence within a particular vehicle and accordingly signal the operator of said particular vehicle by vibrating, or producing audio-visual signal for operator to produce given verbal password into said breathalyzer prior to starting the vehicle engine, or signal the particular vehicle operator to produce given verbal password during rolling breath test.

In addition, in the present invention, the voice recognition breathalyzer could be installed in a mobile phone capable of analyzing user's breath sampling with user voice recognition for user identification and send said data to a monitoring station, or signaling said vehicle ignition interlock CPU through said vehicle GPS/GSM or pager unit, to disable said vehicle ignition interlock devise, or to start said vehicle engine.

In the present invention, a monitoring station is capable of signaling the user to give a verbal password into said voice recognition breathalyzer mobil phone, during user given verbal speech, if alcohol is detected, said user ID and alcohol detection data through said mobile phone will be sent to a monitoring station.

In a preferred embodiment of the present invention a person to be monitored is carrying a portable video phone, or the vehicle operated by such individual is equipped with a "mobile video phone" which will be utilized for additional identification. The video images are sent to a monitoring station through an RF link. If needed, the mobile phone or videophone used in the invention could be connected to medical instruments which are capable of measuring a persons blood pressure, heart rate (EKG) Blood analyses, cholesterol, Blood sugar Etc. and sent said information data to a monitoring station via RF link.

In preferred embodiment of the invention, during a rolling test, if the driver fails to comply or alcohol is detected in the operator's breath during given password speech said vehicle emergency lights will flash, and the vehicle's horn will honk. Additionally, the vehicle could be equipped with GPS/GSM or pager unit. The GSM modem sends said vehicle/driver ID and it's location to a monitoring station. If the driver of the vehicle pulls over and turns the vehicle engine off, the emergency lights stop flashing and the horn stops honking. If the operator does not comply, the monitoring station sends a signal through the GPS/GSM or pager to said vehicle immobilizer CPU to shut down said vehicle ignition interlock at a safe speed, and notify authorities with it's location.

In the present invention, if person to be tested "Loses their voice" or "catches a cold," their voice may not be recognizable by the system, or if the voice recognition circuitry malfunctions, In this case the operator calls the monitoring station through the vehicle mount GPS/GSM phone to identify themselves ask for system override signal from the monitoring station. And finally in the present invention, the monitoring station is connected to a server and said data information could be accessed by patrol vehicle mount PC or hand held PC through mobile server or by web server.

B—Indicates Audio Visual functionality of Remote breathalyzer

C—Indicates LCD visual functionality of Remote breathalyzer

D—Is a Mobile Phone with voice Recognition breathalyzer

E—Is a Video phone with voice recognition breathalyzer

Figure 1A:
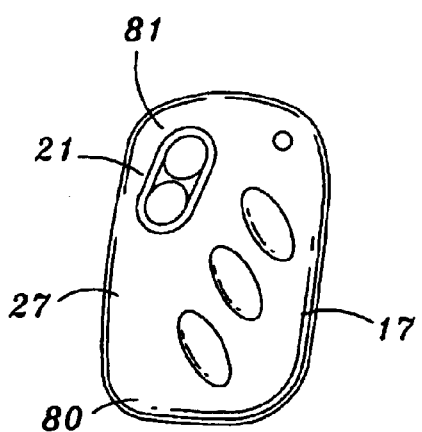
FIG. 1A—Is a Remote RF voice Recognition breathalyzer.
Figure 1B:
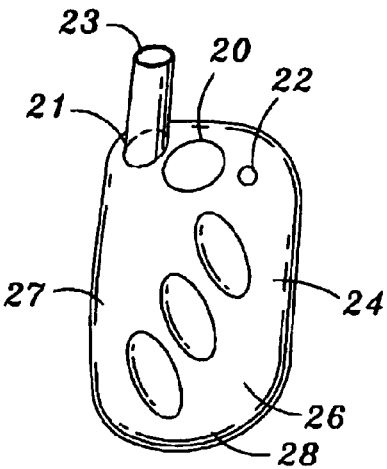
Figure 1C:
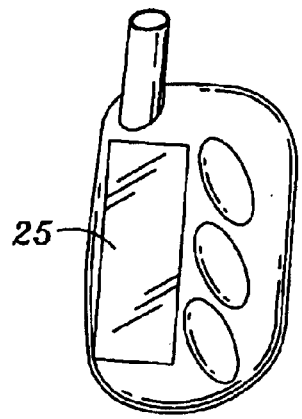
Figure 1E:
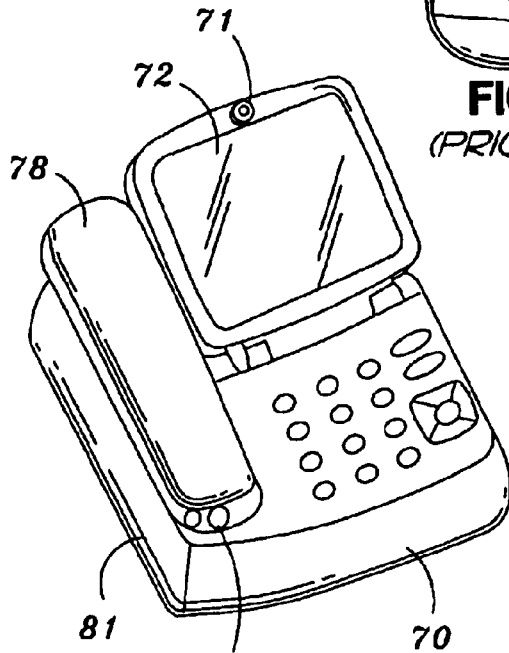
Figure 1D:
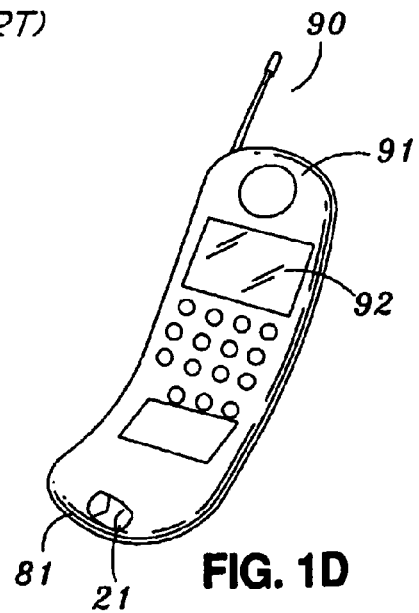
Figure 2B:
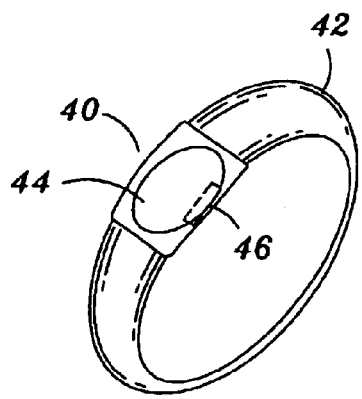
Figure 2A:
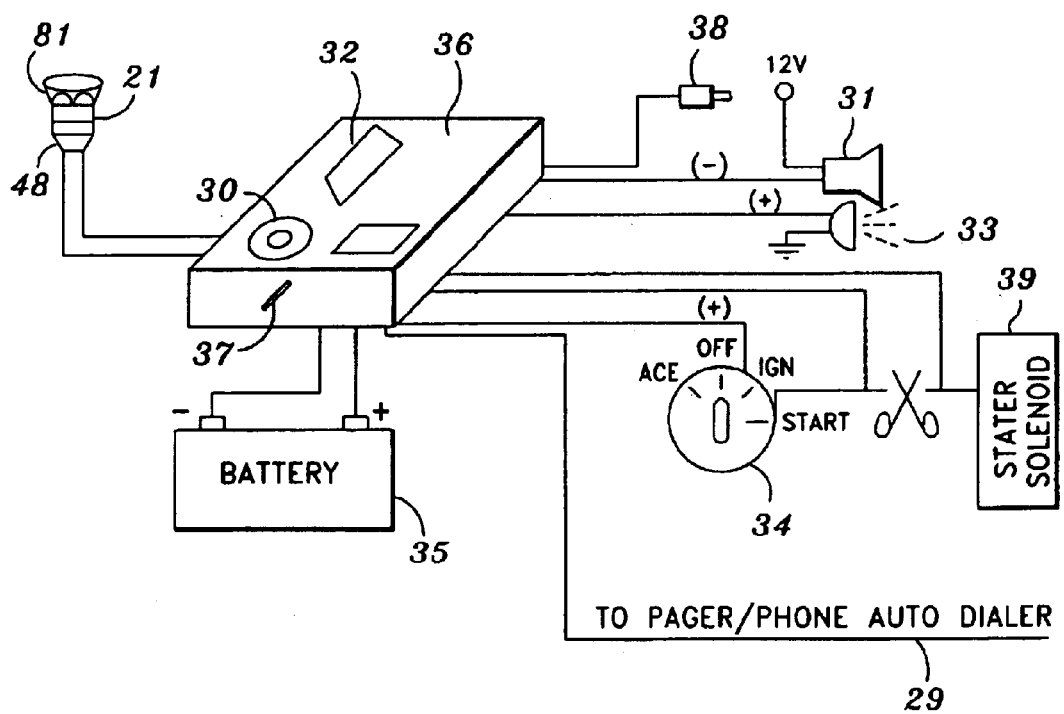

FIG. 2A—Is a voice Recognition breathalyzer Immobilizer and Alarm Module With wiring Diagram.

B—Is a wrist Transceiver watch style unit with built in Vibrator.

Figure 3:
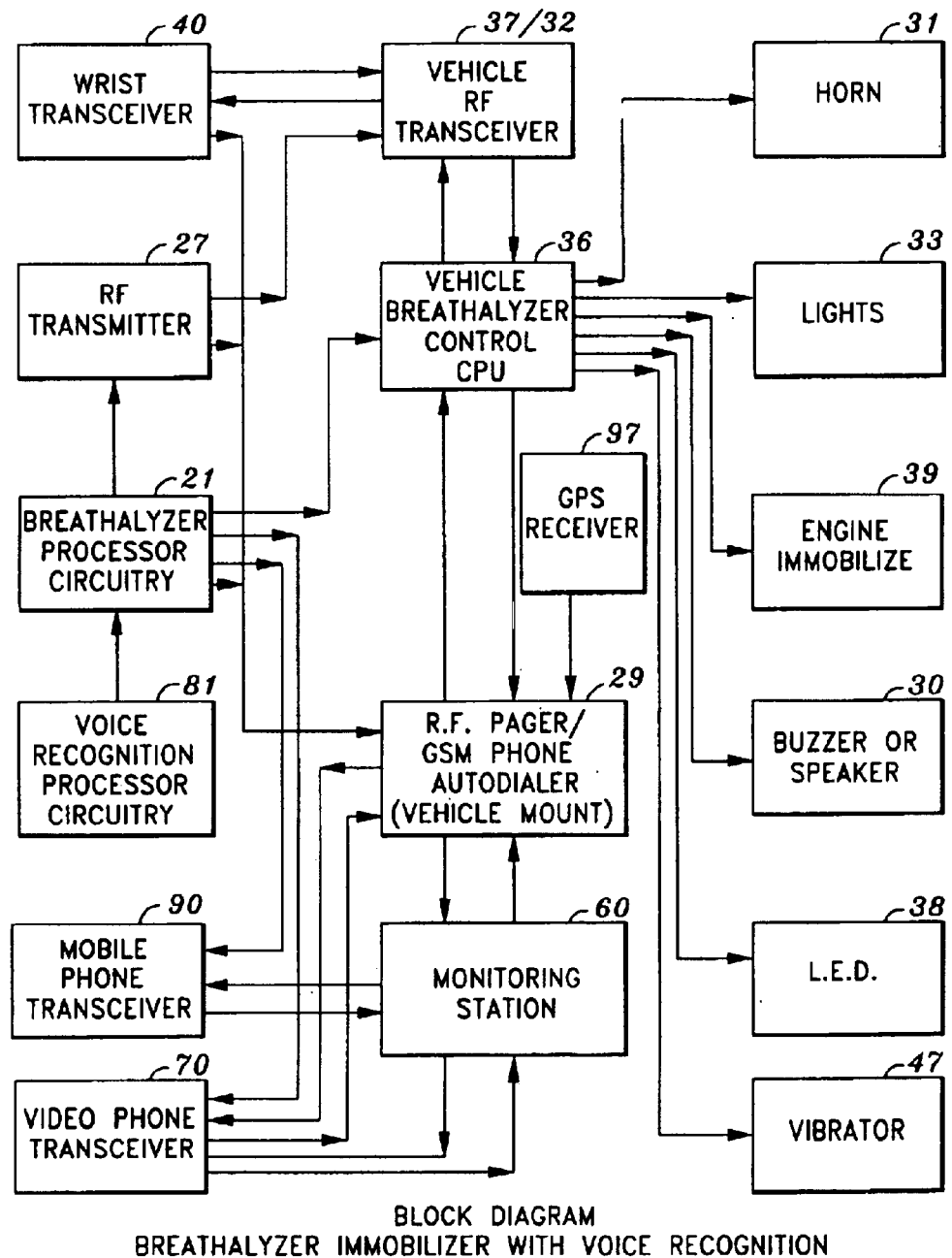

FIG. 3 Is general Block Diagram of a RF voice Recognition breathalyzer with Vehicle control system.

DETAILED DESCRIPTION OF THE INVENTION

For the better understanding of the present invention, an RF remote control voice Recognition breathalyzer operational signal will be first described and a vehicle installed breathalyzer immobilizer interlock device and further on, a Mobile phone with a voice recognition breathalyzer along with videophone breathalyzer will be described.

As shown in FIG. 1-A. RF voice Recognition breathalyzer system 80 comprises of a RF Transmitter 27 for transmitting a unique remote control RF signals controlled by a processor using a microphone 81 and a breath sensor 82 connected to said processor to process user given verbal password with breath, during said given password speech.

FIG. 1-B Illustrates Extendable mouthpiece 23 used for full lung inhale exhale test. A Tri-Color LED 22 is used to indicate visual operation status. A multi-tone Beeper 20 is used to indicate audible operation status. A reset button 24 is used to turn the system On. Transmit Buttons 26 and 28 is used for transmitting RF commands.

FIG. 1-C Illustrates alphanumeric LCD display 25 indicating Visual operation status.

As shown in FIG. 1-D Illustrates a Mobil Phone with a built-in voice recognition breathalyzer 90 comprises, a Microphone 81 and a breath sensor 21 circuitry connected to a processor to process user given password and breath content and a speaker 91 for user to receive verbal instruction, and a RP transceiver 95 to communicate with a monitoring station or to transmit verbal or DTMF commends to a vehicle mount immobilizer CPU.

Additionally FIG. 1-E Illustrates a videophone with a built-in voice Recognition breathalyzer 70 comprises, a microphone 81 and a breath sensor 21 circuitry in handset 78 connected to a processor to process user given password and breath content. A Camera 71 to take video images of the user. A TFT screen 72 used as a monitor and a transceiver 95 to communicate with a monitoring station.

As shown in FIG. 2-A an immobilizer CPU 36 for receiving commands from voice Recognition breathalyzer 48 or receiving 32 RF commands from RF voice Recognition breathalyzer 80. And communicate with wrist transceiver 40 for monitoring the presence of person to be monitored and transmit 37 a signal to vibrate the operator's wrist transceiver for the operator to give verbal breath test. The device receives command signals and sends event reports through a GSM phone/pager 29 and communicate's with a monitoring station 60. A buzzer/speaker 30 is used to create audible or verbal signal to alert the operator to give verbal breath test and controlling vehicle mount LED 38 indicating system arm disarm status, controlling vehicle horn 31 to honk during operator sobriety test fail, controlling the flashing of vehicle emergency lights 33 to indicate operator sobriety test fail, controlling vehicle ignition interlock 34 and 39 and controlling vehicle mount vibrator 47 to signal driver to give random breath sobriety test. Battery 35 is used as power supply.

As shown in FIG. 2-B a watch style wrist transceiver 40 having a battery 44 as power supply for transmitting a unique ID coded signal to vehicle mounted immobilizer CPU, receiving signals from a vehicle mount immobilizer CPU and upon receiving said signal a the transceiver vibrates the built-in vibrator 46 to signal the operator of vehicle to give verbal breath test into the breathalyzer. And a tamper proof conductive strap 42 is being used to prevent the operator from removing the wrist transceiver.

The present invention utilizes a RF Remote Control voice Recognition breathalyzer 80 powered by a battery 17. In order to operate the RF voice recognition breathalyzer 80, user's voice must be programmed first. Pressing button 24 turns the power on, then pressing buttons 26 and 28 together three times the voice recognition breathalyzer 80 will enter in voice learning mode. The LED 22 will flash Red/Yellow indicating the system is in learning mode, the operator gives given password speech, LED 22 start to flash again RED/Yellow signaling to the operator to repeat given password again for confirmation. If proper password is given, the LED 22 blinks one time Green indicating given password has been given successfully. If person operating the voice Recognition breathalyzer is required to be tested every time to operate the voice Recognition breathalyzer 80 then button 26 must be press one time within time window right after completion of voice learning process. Note: when button 26 is pressed right after voice learning process only one person one time can be programed in the system. If button 28 is pressed right after testing, multiple user voice can be programed, by first user first giving given spoken password into the voice recognition breathalyzer and then entering the system into voice learning mode. If password learning process failed the LED 22 Blinks one time yellow. The user will repeat the process again.

Operation: In order to operate the RF voice Recognition breathalyzer the user first pushes the reset button 24 to power up the system, within few seconds the built in beeper 20 beeps and LED 22 flashes green or the Alphanumeric LCD 25 displays system ready symbol or letters. The operator gives a given spoken password into the microphone 81 and breath sensor 21 by holding the voice Recognition breathalyzer 80 an inch away from operators mouth. Once the password and breath are received in the voice Recognition breathalyzer 80, they are analyzed. If no alcohol is found, the LED 22 turns momentarily green or LCD 25 display indicates "pass" symbol, the voice Recognition breathalyzer 80 transmits a Test Pass signal or at a given time window allows the user to press button 26 to transmit said pass signal to a vehicle mounted receiver 32 CPU 36 which upon receipt of said signal disables said vehicle ignition immobilizer 34 and 39 and the operator successfully can start the vehicle.

If the operator given verbal password breath contains alcohol. The RF voice Recognition breathalyzer 80 produces a warning beep through the built-in beeper 20 and LED 22 will flash red or LCD 25 displays "Failed" symbol and The voice Recognition breathalyzer 80 automatically transmits a unique RF failed coded signal, giving the operator "0" tolerance to operate any vehicle or machinery. In some application the voice Recognition breathalyzer 80 could be programed not automatically to transmits "Fail" RF signal Transmission.

In the preferred embodiment of the invention if operator is allowed to operate a vehicle with certain amount of BAC in his or her system, the present invention allows the vehicle operator within a short time frame after given verbal "failed" test, to give a full lung inhale exhale breath test into said breathalyzer mouth piece 23 which require full lung exhale breath pressure in order to let given breath to pass through said mouth piece to determine exact amount of alcohol in operators system. If full lung exhale test is below certain setting threshold, then the voice recognition breathalyzer 80 will transmit a unique "pass" code signal with breath alcohol content data. If full lung inhale exhale test failed, then the voice Recognition breathalyzer 80 Transmits a breath Test "fail" signal containing data information amount of BAC found in the operators system. After given verbal breath "Fail" test, if operators full lung breath exhale sample given does not contain any amount of alcohol, because it is off some one else's given breath or bogus air Exp. air from a balloon, or a bike pump or given in improperly, the RF voice Recognition breathalyzers 80 Beeper 20 will beep. LED 22 turns on momentary "RED" or Alphanumeric LCD screen Displays "error" symbol and transmits a RF "error" coded signal. In In order to save battery power, the present invention has an auto power shut down features, and when there is low battery condition within the RF voice Recognition breathalyzer 80, the LED 22 turns steady yellow or alphanumeric LCD 25 displays "low Battery signal". In addition, RF voice Recognition breathalyzer transmits a low battery RF unique coded signal. In the present invention, a voice Recognition breathalyzer can be remote control 80 operated. According to the invention, a voice Recognition breathalyzer 48 could be installed in a vehicle and connected to a vehicle mount immobilizer CPU 36

RF voice Recognition breathalyzer could be used in many different applications, such as when it's used with a vehicle mount immobilizer CPU 36 unit. When the immobilizer CPU 36 receives breath test "pass" signal from voice Recognition breathalyzer 80 unit, the operator can start the vehicle engine successfully. During vehicle ignition "On" position the immobilizer CPU 36 will random prompt audio-visual signal through beeper 30. LED 38. Vibrator 47 to the operator of vehicle in order the operator to give verbal given password into said RF voice Recognition breathalyzer 80 or into voice Recognition breathalyzer 48 during driving to prevent the driver from drinking during driving. If driver gives the proper password containing nontoxic breath. The voice Recognition RF breathalyzer 80 or voice Recognition breathalyzer 47 transmits a "pass" code signal. The immobilizer CPU 36 upon receiving the "pass" signal, operates in its normal operating mode. If the operator fails to give proper password or no password at all or gives password containing toxic breath within a predetermine time, the immobilizer CPU 36 will flash the vehicle lights 33, honk the vehicle horn 31, and immobilize the vehicle ignition 34, or fuel pump circuitry.

The vehicle mounted Immobilizer CPU 36 is capable of receiving unique coded signal from an RF voice Recognition remote control unit. The RF voice recognition Remote control unit is used by individuals for whom it is not necessary for breath sobriety test to disarm said vehicle immobilizer CPU. The immobilizer CPU 36 will disarm by receiving coded RF signal from said voice recognition remote control unit. Said vehicle immobilizer CPU 36 upon receiving said unique coded signal will not initiate random audio-visual 30 and 38, or vibrating signals 46 and 47 to the operator, for the operator to give given verbal password into said voice recognition breathalyzer.

In the preferred embodiment of the invention a GPS receiver 49 is connected to a mobile phone/pager 29 or a satellite modem, and said Mobile phone 29 is connected to said vehicle CPU 36 unit. If and when said vehicle immobilizer CPU 36 receives a unique test "fail" signal from said voice Recognition breathalyzer 80 and 48. The vehicle immobilizer CPU 36 sends a signal containing information relating to said vehicle and driver ID along with sobriety test fail code to said vehicle GSM phone, or Pager unit 29, and said GSM phone/pager unit 29, signals a monitoring station 60 with information containing operator ID with breath test fail data, Vehicle ID along with it's location. Said monitoring station upon receiving said signal can locate said vehicle by using a PC containing GPS map software, and send a signal to said particular vehicle immobilizer CPU 36, through said vehicle mount GSM/phone or pager 29, to immobilize said vehicle engine at a safe speed. It is according to the present invention, the monitoring station could utilize a data base server or a internet server, which could give law enforcement agency direct access to said database via portable or desk PC.

It is according to the present invention, the monitoring station 60 at any given time can sent verbal or audible signal to the operator of a particular vehicle to give given verbal password into a voice recognition breathalyzer 48 and 80, for on spot sobriety test, through said vehicle mount GSM phone or pager modem.

The present invention could be used in a more effective way, by utilizing a tamper proof wrist watch style transceiver unit 40, warn by the person to be monitored, transmitting a RF coded signal periodically, or upon receiving a RF signal from said vehicle mounted Transceiver CPU 36. When the immobilizer CPU 36 receives wrist transmitter signal, at a predetermine time, the immobilizer CPU 36 will initiate audio-visual 30 and 38, vibrating signal 47, or a RF signals to a wrist transceiver 40 to vibrate the built-in vibrator 46, signaling to the operator to give a given verbal password into said voice recognition breathalyzer 80 or 48.

In addition a voice Recognition breathalyzer, could be utilized in a phone, or a mobile phone 90, capable of analyzing user breath content. When person to be monitored gives the given password into said voice recognition phone, the Phone 90 and 70 has a built in microphone with voice recognition circuitry 81, to receive and analyze given password. A breath sensor with breathalyzer circuitry 21 to receive and analyze given breath sample(s). And a phone transceiver 90 and 70, to communicate with a monitoring station or to give commands to disarm vehicle immobilizer or to start the vehicle. A LCD 92 or TFT screen 72 display alphanumeric commands, and a camera to capture the photo images of the user and sends the photo image to a monitoring station 60. Operation: User(s) voice is preprogrammed into the voice recognition breathalyzer phone 90 and 70. The User first press the reset button to power up the voice Recognition breathalyzer Phone. When user gives given password into said voice Recognition phone 90 and 70, the voice processor upon voice recognition signals the breathalyzer processor to process users given breath sample, if given sample is nontoxic, the operator can give verbal or DTMF commands to disarm a particular vehicle equipped with a immobilizer CPU 36 through a vehicle mount GSM phone or a pager 29 receiver unit. If given password breath is toxic, then the speaker gives a warning beep and the LCD display indicates "fail" symbol, the user can not send verbal or DTMF commands. In the present invention, a monitoring station 60, can signal a phone user at any given time by giving verbal or audible signals through said phone 90 and 70, for the operator of said phone 90 and 70, to give verbal password into said voice recognition breathalyzer phone 90 and 70, for system to identify and to analyze user given breath sample, during given speech, and send said user ID information along with breath test Fail information to a monitoring station 60. The monitoring station 60 to determine precise BAC reading, signals the operator to perform full lung inhale exhale breath into said voice Recognition breathalyzer Phone 70 and 90, and said phone breathalyzer processor circuitry 21 upon analyzing said given verbal password with breath content, sends said process breath content data to a monitoring station 60. In addition the built in camera 72 can capture and send photo images through a modem to a monitoring station 60, for pictorial identification verification of the user by said monitoring station PC.

What is claimed is:

1. A vehicle voice recognition breathalyzer system comprising:
   a. a microphone for receiving spoken expression and generating a signal corresponding to said spoken expression;
   b. a breathalyzer sensor receiving a breath sample and generating a signal corresponding to said breath sample;
   c. an audio and breathalyzer sensor input circuit for receiving and conditioning said signals generated from said microphone and said breathalyzer sensor;
   d. a memory storage for storing speech templates and a breath toxicity setting;
   e. a vehicle breathalyzer CPU for receiving said conditioned signals generated from said audio and breathalyzer sensor input circuit, said vehicle breathalyzer CPU being operative to process and compare said conditioned electronic signals with said speech templates and said toxic breath settings stored in said memory storage; and
   f. a communications device selected from the group consisting of a pager and mobile phone;
   g. a GPS system;
   h. wherein said vehicle breathalyzer CPU is further operative to generate a pass signal when said processed, conditioned electronic signals are substantially similar to a respective one of said speech templates stored within said memory and below said breath toxicity setting, respectively; and
   i. wherein said vehicle breathalyzer CPU is operative to activate said communications device to transmit a coded signal containing information indicative of a user ID and breath toxicity content to a remote monitoring station and activate said GPS to transmit information indicative of the location of said vehicle when said communications signal is transmitted upon receipt of either:
      i. a spoken expression that is not substantially identical to a speech template stored within said memory storage; or
      ii. said conditioned electronic signal corresponding to said breath sample possesses a toxicity exceeding said breath toxicity setting.

2. The vehicular voice recognition breathalyzer system of claim 1 wherein said system further comprises:
   a. engine immobilization circuitry operatively coupled to the engine of the vehicle, said engine immobilization circuitry being operative to receive signals from said remote monitoring station and immobilize said engine of the vehicle upon receipt of said signals transmitted by said remote monitoring station.

3. The vehicular voice recognition breathalyzer system of claim 1 wherein said vehicle breathalyzer CPU is operative to permit operation of said vehicle upon generation of said pass signal.

4. A vehicular voice recognition breathalyzer comprising:
   a. a vehicle;
   b. a remote monitoring station;
   c. microphone means for receiving spoken expression and producing a first signal corresponding thereto;
   d. breathalyzer sensor means for receiving a breath sample and transmitting a second signal corresponding thereto;
   e. an audio and breathalyzer sensor input means for receiving and conditioning said first and second signals;
   f. storage means for storing speech templates and breath toxicity settings;
   g. a vehicle breathalyzer CPU operative to receive said conditioned signals and compare said signals with said speech templates and said breath toxicity settings stored in said storage means;
   h. a communications device selected from the group consisting of a pager and mobile phone, said communications device being installed within said vehicle;
   i. a GPS system operatively coupled to said vehicle, said GPS system being operative to produce a signal corresponding to the location of said vehicle; and
   j. wherein when spoken expression is provided to said microphone means and a breath sample is provided to said breathalyzer sensor means, said vehicle breathalyzer CPU is operative to produce a pass signal when said spoken expression conforms to said specific speech template for said individual stored within said storage means as prescribed by said unique coded signal and said breath sample possesses a toxicity below a breath toxicity setting stored within said storage means; and
   k. wherein said vehicle breathalyzer CPU is operative to actuate said communications device to generate a communication signal to said monitoring station and actuate said GPS device to transmit a signal indicative of said vehicle's location upon either:
      i. a spoken expression that is not substantially identical to a speech template stored within said storage means; or
      ii. said conditioned electronic signal corresponding to said breath sample possesses a toxicity exceeding said breath toxicity setting, said communications device being operative to transmit a coded signal containing information indicative of user ID and breath alcohol content to a remote monitoring station.

5. A vehicular voice recognition breathalyzer comprising:
   a. a vehicle;
   b. a remote monitoring station;
   c. microphone means for receiving spoken expression and producing a first signal corresponding thereto;
   d. breathalyzer sensor means for receiving a breath sample and transmitting a second signal corresponding thereto;
   e. an audio and breathalyzer sensor input means for receiving and conditioning said first and second signals;
   f. storage means for storing speech templates and breath toxicity settings;
   g. a vehicle breathalyzer CPU operative to receive said conditioned signals and compare said signals with said speech templates and said breath toxicity settings stored in said storage means;

h. a first RF transceiver or receiver operatively coupled to said vehicle breathalyzer CPU;

i. a second RF transceiver or receiver adapted to be operatively coupled to an individual, said first and second transceivers or receivers being operative to communicate a unique code signal to one another when said first and second transceivers or receivers are in close proximity relative said vehicle, said unique coded signal being operative to select a specific speech template password and breath toxicity setting stored within said memory storage, said speech template password and said breath toxicity setting being operative to selectively identify said individual;

j. wherein when spoken expression is provided to said microphone means and a breath sample is provided to said breathalyzer sensor means, said vehicle breathalyzer CPU is operative to produce a pass signal when said spoken expression conforms to said specific speech template for said individual stored within said storage means as prescribed by said unique coded signal and said breath sample possesses a toxicity below a breath toxicity setting stored within said storage means; and k. wherein said vehicle breathalyzer CPU is operative to produce an audio/visual signal when said spoken expression that is not substantially identical to said specific speech template password.

* * * * *